(12) United States Patent
Tan et al.

(10) Patent No.: US 10,277,161 B2
(45) Date of Patent: Apr. 30, 2019

(54) PHOTOVOLTAIC ROOF COVERING

(71) Applicant: VIRIDIAN CONCEPTS LTD., Papworth, Cambridgeshire (GB)

(72) Inventors: K. T. Tan, Papworth (GB); S. A. Elmes, Papworth (GB)

(73) Assignee: VIRIDIAN CONCEPTS LTD., Papworth, Cambridgeshire (GB)

(*) Notice: Subject to any disclaimer, the term of this patent is extended or adjusted under 35 U.S.C. 154(b) by 0 days.

(21) Appl. No.: 15/255,686

(22) Filed: Sep. 2, 2016

(65) Prior Publication Data

US 2017/0070182 A1 Mar. 9, 2017

(30) Foreign Application Priority Data

Sep. 4, 2015 (GB) .................................. 1515708.4

(51) Int. Cl.
*H02S 20/23* (2014.01)
*H02S 30/10* (2014.01)
(Continued)

(52) U.S. Cl.
CPC .............. *H02S 20/23* (2014.12); *F24S 20/67* (2018.05); *F24S 25/20* (2018.05); *F24S 25/35* (2018.05);
(Continued)

(58) Field of Classification Search
CPC ......... F24J 2002/5213; F24J 2002/5218; F24J 2002/522; F24J 2002/5226; F24J 2/46; F24J 2/52; F24J 2/5203; F24J 2/5207; F24J 2/5209; F24J 2/5211; F24J 2/523; F24J 2/5233; F24J 2/5235; F24J 2/5243;
(Continued)

(56) References Cited

U.S. PATENT DOCUMENTS 4,123,883 A 11/1978 Barber, Jr. et al.
7,600,349 B2 * 10/2009 Liebendorfer ......... F24J 2/5207
136/244

(Continued)

FOREIGN PATENT DOCUMENTS

EP 2 447 621 A1 5/2012
EP 2 520 876 A1 11/2012
(Continued)

OTHER PUBLICATIONS

British Search Report issued in GB 1515708.4 dated Feb. 17, 2016.
(Continued)

*Primary Examiner* — Jessica L Laux
(74) *Attorney, Agent, or Firm* — Sughrue Mion, PLLC

(57) ABSTRACT

There is provided a bracket, comprising: a first portion configured to hold a first solar panel connector of a first solar panel module; a second portion configured to provide a guide along the length of the second portion for a second solar panel connector of a second solar panel module, the first and second portions being configured so that, when first and second solar panel connectors are connected to the bracket, the first and second solar panel modules protrude away from the bracket in different directions; and a third portion connected to said first and second portions and configured for attachment to a roof structure.

11 Claims, 4 Drawing Sheets

(51) Int. Cl.
*F24S 80/70* (2018.01)
*F24S 20/67* (2018.01)
*F24S 25/35* (2018.01)
*F24S 25/20* (2018.01)
*F16B 5/06* (2006.01)
*F24S 25/00* (2018.01)

(52) U.S. Cl.
CPC .............. *F24S 80/70* (2018.05); *H02S 30/10* (2014.12); *F16B 2005/0678* (2013.01); *F24S 2025/021* (2018.05); *Y02B 10/12* (2013.01); *Y02B 10/20* (2013.01); *Y02E 10/44* (2013.01); *Y02E 10/47* (2013.01)

(58) Field of Classification Search
CPC ........ F24J 2/5249; F24J 2/5252; F24J 2/5254; F24J 2/5256; F24J 2/5262; H02S 20/23; H02S 30/10
See application file for complete search history.

(56) References Cited

U.S. PATENT DOCUMENTS

| | | | |
|---|---|---|---|
| 7,956,280 B2 * | 6/2011 | Kobayashi | F24J 2/5211 126/704 |
| 8,128,044 B2 | 3/2012 | Liebendorfer | |
| 8,495,839 B2 * | 7/2013 | Tsuzuki | F24J 2/4614 136/244 |
| 9,166,524 B2 * | 10/2015 | West | F24J 2/5205 |
| 9,276,519 B2 * | 3/2016 | Kobayashi | F24J 2/5245 |
| 9,413,286 B2 * | 8/2016 | Danning | B23P 11/00 |
| 2003/0201009 A1 * | 10/2003 | Nakajima | F24J 2/5207 136/251 |
| 2008/0302407 A1 * | 12/2008 | Kobayashi | F24J 2/5211 136/251 |
| 2010/0288336 A1 * | 11/2010 | Kitano | F24J 2/5207 136/251 |
| 2010/0294345 A1 * | 11/2010 | Leithold | F24J 2/5207 136/251 |
| 2011/0047903 A1 * | 3/2011 | Kobayashi | F24J 2/5211 52/173.3 |
| 2011/0239554 A1 * | 10/2011 | Tsuzuki | F24J 2/045 52/173.3 |
| 2013/0167925 A1 | 7/2013 | Roppelt | |
| 2013/0340358 A1 | 12/2013 | Danning | |

FOREIGN PATENT DOCUMENTS

| | | |
|---|---|---|
| EP | 2 592 197 A1 | 5/2013 |
| GB | 2 430 943 A | 4/2007 |
| WO | 2008/105296 A1 | 9/2008 |
| WO | 2012/119162 A1 | 9/2012 |

OTHER PUBLICATIONS

Communication dated Oct. 16, 2017 from the European Patent Office in counterpart Application No. 16187008.4.

* cited by examiner

PHOTOVOLTAIC ROOF COVERING

FIELD OF THE INVENTION

The present invention relates to a bracket, a solar panel connector, a system, a kit and associated methods.

BACKGROUND

The use of photovoltaic panels on a roof for providing a roof covering is well established.

In previously described systems (such as those outlined in UK patent publication number GB 2,430,943 B), there are described components and systems for connecting a solar panel (also termed herein as a photovoltaic panel) to a roofing structure. In particular, it is described to provide a watertight seal between a solar panel and the traditional roofing structure (e.g. between a solar panel and a conventional roof tile).

In one existing roofing system, solar modules are manufactured with a size and format equivalent to the tiles that they are replacing in the roof. The term solar module is used herein to mean an apparatus including a solar panel and any attachment means affixed therewith. In such roofing structures, the bottom of one row of tiles overlaps the top of a preceding row to ensure that water flows down the roof from the upper row of tiles to the lower. Typically, such a solar module is the size of a row of four adjacent roofing tiles. The solar module may interface with traditional tiles at the boundary directly or there may be a pressed metal flashing kit required to form the boundary between the two materials. This type of roofing system normally suffers from high cost due to the low volume of manufacture compared to standard photovoltaic panels and is labour intensive to install due to the numerous fixings and connections required.

In a second existing roofing system, there is provided a thin waterproof sub-layer below the solar panels. This thin waterproof sub-layer may formed from a roll of corrugated metal or polymer or from a number of overlapping polymer trays. The thin waterproof sub-layer is fixed to the roof by screwing "fixing points" through the sub-layer to the roof below. Standard solar modules are in turn fixed to these fixing points. This embodiment benefits from the economies of scale of utilising standard sized solar modules but suffers from being labour intensive to install, with the resulting quality being highly dependent on the skill and diligence of the installer.

SUMMARY

The present application is directed towards providing a weather-tight roof covering for solar panels and their connectors. In particular, the present application is directed towards providing components and an overall system for assembling a photovoltaic panelled roof that is rapid to install and creates an efficient close-packed array of standard-sized photovoltaic panels, while forming a weather tight seal between photovoltaic panels.

According to a first aspect, there is provided a bracket, comprising: a first portion configured to hold a first solar panel connector of a first solar panel module; a second portion configured to provide a guide along the length of the second portion for a second solar panel connector of a second solar panel module, the first and second portions being configured so that, when first and second solar panel connectors are connected to the bracket, the first and second solar panel modules protrude away from the bracket in different directions; and a third portion connected to said first and second portions and configured for attachment to a roof structure.

The first portion may be configured to be rotatable onto the first solar panel connector, the first portion further comprising a retaining mechanism configured for locking the rotation of the bracket with respect to the first solar panel after the first portion has been rotated onto the first solar panel connector.

The bracket may be shaped/configured such that the first and second portions are located at one end of the bracket and the third portion is located at an opposite end of the bracket. The first and second portions may be separated from the third portion of the bracket via a single connection. The bracket may be substantially U-shaped, the first portion being located along one of the legs of the U-shape, the second portion being located along the other of the legs of the U-shape and the third portion being located along the base of the U-shape. The bracket may be configured to receive a U-shaped guttering and at least one item of flashing within the U-shape of the bracket.

The first portion may be configured to hold the first solar panel connector slidably, so that the first solar panel connector may be guided along the length of the first portion.

According to a second aspect, there is provided a solar panel connector for incorporating into a roof, the solar panel connector comprising: a first portion extending along one or more sides of the solar panel connector for receiving an edge section of a flashing to provide a weather-proof connection between the flashing and the solar panel connector; and a second portion extending along one or more sides of the solar panel connector for receiving an edge section of a bracket and configured to receive said bracket slidably in the second portion along the length of the second portion.

The first portion may comprise one or more resilient members such that, in use, the insertion of flashing into the first portion automatically forces at least one of said resilient members into a configuration in which they are biased against the flashing.

The solar panel connector may have a first side configured to receive a solar panel and a second side, opposite to the first side, via which the first and second portions are accessible by the flashing and the bracket.

The first portion may be arranged to be above the second portion when the solar panel connector is being used to fix a solar panel to a roof.

The first portion may be formed as a continuous gasket around the periphery of the solar panel connector.

The first portion of the solar panel connector may comprise one or more resilient members such that, in use, the insertion of a bracket into the second portion automatically forces at least one of said resilient members into a configuration in which they are biased against the bracket.

According to a third aspect, there is provided a system comprising: a first solar panel connector as described above; a first solar panel joined to the first solar panel connector; a second solar panel connector as described above; a second solar panel joined to the first solar panel connector; and a bracket as described above, the bracket being connected to the first solar panel connector along the first portion of the bracket and the bracket being slidably connected to the second solar panel along the second portion of the bracket so as to provide said guide.

The first portion of the bracket may be configured to hold the first solar panel connector slidably, so that the first solar panel connector may be guided along the length of the first portion of the bracket.

When the bracket is substantially U-shaped, the first portion being located along one of the legs of the U-shape, the second portion being located along the other of the legs of the U-shape and the third portion being located along the base of the U-shape and/or when the bracket is configured to receive a U-shaped guttering and at least one item of flashing within the U-shape of the bracket, the system may further comprise: U-shaped guttering located within the bracket, the height of the U-shaped guttering being below the height of the first portion of the first solar panel connector and the first portion of the second solar panel connector to prevent sliding movement between the gutter and the bracket when the gutter is inserted into the bracket. The U-shaped guttering may be located within the bracket so as to have an interference fit therebetween. The system may further comprise a first flashing retained within the first portion of the first solar panel connector to provide a weather-proof connection between the first solar panel connector and the flashing. The first flashing may be further retained within the first portion of the second solar panel connector to provide a weather-proof connection between the second solar panel connector and the flashing.

The first flashing may be configured such that, on being inserted into the first portion of the first solar panel connector, the thin sheet extends into the first portion of the second solar panel connector on the mating face of the second panel connector as the second solar panel is slid along the bracket, producing a weather tight seal between the first and second solar panel connectors. The system may further comprise a second flashing retained within the first portion of the second solar panel connector to provide a weather-proof connection between the second solar panel connector and the flashing.

The first portion of the first solar panel connector and the first portion of the second solar panel connector may be configured to align in the same plane when in use.

According to a fourth aspect, there is provided a kit comprising: a first solar panel connector as described above; a bracket as described above; and a first flashing comprising a first portion configured to be retained within a slot of the first solar panel connector to provide a weather-proof connection between the first flashing and the first solar panel connector.

According to a fifth aspect, there is provided a flashing for use as flashing on a roofing structure, the flashing comprising: a first portion configured to be retained within a slot of a first solar panel connector to provide a weather-proof connection between the flashing and the first solar panel connector; a second portion configured to be retained within a slot of a second solar panel connector to provide a weather-proof connection between the flashing and the second solar panel connector; and a middle portion located between the first and second portions and comprising at least one rib for providing stiffness to the flashing.

The middle portion may be further configured to provide a minimum separation between the first and second solar panel connectors According to a sixth aspect, there is provided a method comprising: connecting a bracket as described above to a second portion of a first solar panel connector as described above; fixing the third portion of the bracket onto at least part of a roofing structure; and sliding a second solar panel connector as described above onto the second portion of the bracket, using the second portion of the second solar panel connector.

The method may further comprising: inserting respective ends of at least one flashing into the first portions of the first and second solar panel connectors for creating a weather-proof seal.

The method may further comprise: inserting a guttering component between the first and second solar panel connectors for defining a gutter therebetween.

The connecting may be performed by rotating the bracket onto the second portion of the first solar panel connector. The rotating may comprise automatically locking the bracket onto the second portion of the first solar panel following a minimum amount of relative rotation between the bracket and the first solar panel.

According to a sixth aspect, there is provided a system substantially as described herein with reference to FIGS. 2 to 5, or to FIGS. 6 to 10.

According to a seventh aspect, there is provided a bracket substantially as described herein with reference to FIG. 11 or to FIG. 12.

It is an aim of the present application to provide a new technique (with associated components) of connecting solar panels to each other and to the roof structure below in a way that is simple and quick whilst providing a weather-tight and durable connection.

FIGURES

Hereunder follows a detailed description of embodiments, by way of example only, with reference to the accompanying drawings, in which.

DETAILED DESCRIPTION

Figure 1:
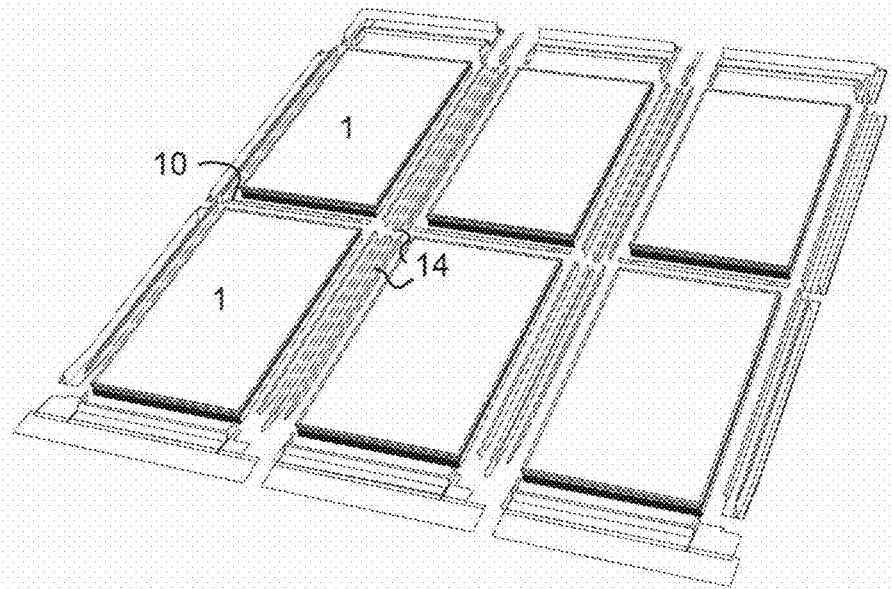
FIG. 1 is a parametric sketch of roofing system made up of an array of two rows and three columns of solar panels.

In the present application, a design of a solar panel connector and roof fixing bracket is disclosed that enables the close-coupling of solar panels/solar modules with a simple push-fit action. In its most general form, the term solar panel connector is used herein to denote a connection on the solar panel module configured for connecting the solar panel module to other components (e.g. to a roof fixing bracket). The solar panel connector may be continuous (so that it completely surrounds a perimeter of the solar panel module) or it may be discrete (so that it does not surround a perimeter of the solar panel module). Where the solar panel connector is continuous, it may simply be a frame surrounding at least part of a photovoltaic glass sheet of the solar panel module.

In the following, there is described a system for connecting together two solar panel modules using their respective solar panel connectors and a bracket configured for both attaching the two solar panel modules in a particular configuration with respect to each other and for attaching the two solar panel modules to at least a part of a roofing structure (for example, to a roof beam or a tile batten). In particular, the bracket is configured so that it is connected to each of the solar panel connectors at respective first and second portions of the bracket. The profiles of the first and second portions of the bracket are asymmetric as they are configured differently. In particular, the first and second portions of the bracket are configured to be suitable for different respective connection mechanism. The bracket is slidably connected to (at least) the second solar panel connector along a first axis. By this, it is meant that the bracket is configured to provide a guide along the length of the second portion of the bracket. The guide is for locating and/or orientating the second solar panel connector/module with respect to the first solar panel connector/module. This is one mechanism for connecting the bracket to a solar panel connector. The first portion of the bracket is configured to connect to a (different) solar panel connector via a second mechanism. In particular, the first portion may be configured to retain the first solar panel connector with respect to the bracket after the first portion has been rotated onto the first solar panel connector so that the first solar panel connector and the bracket may move laterally relative to each other only along the length of the first potion. In other words, the first portion may be configured to retain the first solar panel connector with respect to the bracket after the first portion has been rotated onto the first solar panel connector so that the first solar panel connector and the bracket may move laterally relative to each other only along the length of the solar panel connector. An additional retaining mechanism may be provided to this effect, or this retention may be effected through the shape of the first portion that interlocks with a complementary shape of the solar panel connector.

In the described embodiments, the bracket is further shown such that it is slidably connected to the second solar panel connector along the first axis. It is understood that, whilst this is an aspect of the described embodiments, other mechanisms for attaching a solar panel and the bracket are also possible. Some of these are mentioned below. When a solar panel module is connected to respective brackets along opposing sides of the module, the solar panel connectors and the bracket are configured to be locked together in use so that each component may only move laterally with respect to each other along a single axis, parallel to the bounded opposing sides.

To illustrate the system, two embodiments are described below with respect to the Figures. The first embodiment is described below with particular reference to FIGS. 2 to 5 and 11, whilst the second embodiment is described below with particular reference to FIGS. 6 to 10 and 12. The first embodiment differs from the second embodiment in that there is configured to be a minimum gap between the first and the second solar panel connectors in the first embodiment, whilst the second embodiment is configured to have a non-minimal gap between the first and the second solar panel connectors, so as to form a gutter therebetween. FIG. 1 illustrates an arrangement in which the first and second embodiments are both implemented in the same roofing structure. This will be discussed later.

First Embodiment

As mentioned above, the first embodiment is directed to an arrangement in which there is no gutter between two solar panel modules 1. In a particular aspect of this arrangement, there is a minimum gap between the two solar panel modules 1.

FIGS. 2 to 5 illustrate a solar panel module 1 having a solar panel connector 2. A photovoltaic glass sheet 3 of a solar panel may attach to the solar panel connector 2 in a recess/slot on a first side of the solar panel connector 2. The attachment point may comprise a sealant compound 4 with the aim of contributing to providing a weather tight seal for the solar panel module 1.

The solar panel connector is provided with at least one further slot 6 on an opposite face/side to the first side of the solar panel connector 2. This further slot 6 is configured to accept a fixing bracket 7. Fixing bracket 7 is shown in an isometric orientation in FIG. 11.

Figure 2:
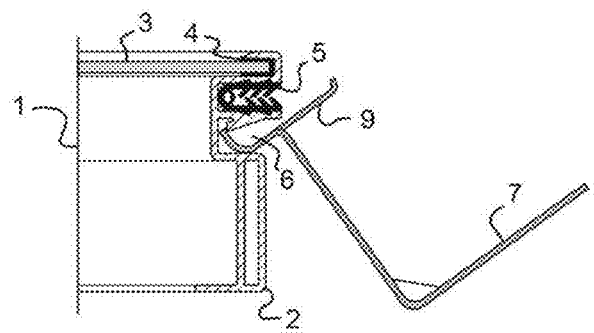
FIG. 2 shows a cross-sectional view of the side of a first solar module with a bracket according to a first embodiment in the process of insertion into the side of the first panel.
Figure 3:
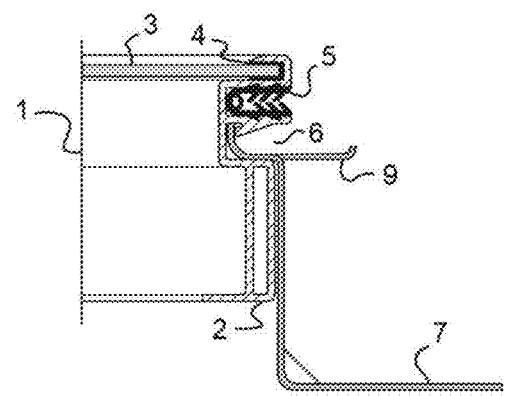
FIG. 3 is as for FIG. 2 with the bracket rotated into a finished position and ready to fix to a roof structure.

The fixing bracket is configured to have at least three portions. A first portion of the bracket is configured to be inserted into the further slot 6 (as shown in FIGS. 2 and 3) and fixed therewith. One way of fixing the first portion of the bracket 7 to the further slot 6 is by simply fixing the two components together using screws or the like. In a preferred embodiment, the first portion of the bracket 7 is configured to be fixed to the further slot 6 by being rotatably inserted into the further slot 6. In this case, the further slot 6 of the solar panel connector comprises retaining means configured to, once the first portion of the bracket has been rotatably inserted, lock onto the first portion so that that the solar panel connector 2 and the bracket 7 are slidably connected to each other. By this, it is meant that the solar panel connector 2 and the bracket 7 are attached to each other in such a way that they may move laterally relative to each other only along a first axis. When the bracket is rotated to an upright position as shown in FIG. 3, the bracket 7 is configured to retain the solar panel perpendicular to the top face and perpendicular to the solar panel side, but not in a sliding direction parallel to the side of the solar panel.

The fixing bracket 7 further comprises a second portion 9. This second portion protrudes away from (i.e. in an opposite direction to) the first portion and presents a face for providing a guide to a second solar panel connector 2' (see FIGS. 4 and 5). The guide is usable by the second solar panel connector 2' for sliding the second solar panel connector 2' along the second portion in the direction of the first axis. In other words, the second solar panel connector 2' is configured to use a face of the bracket as a guide along the length of the bracket to locate and/or orientate the second solar panel connector 2' with respect to the first solar panel connector 2. In particular, to set any displacement/offset of the outermost face of the photovoltaic glass 3 of the second solar panel connector 2' with respect to the outermost face of the photovoltaic glass 3 of the first solar panel connector 2. Preferably, the offset is zero.

Preferably, a face of the first portion and a face of the second portion of the bracket 7 are configured to respectively contact faces on the first and second solar panel connectors for holding the first and second solar panels in configurations in which the solar panel connectors 2, 2' may be slid along the same plane, as well as along the same axis (although it is understood that this is not essential). The bracket 7 may be said to cause the respective connection points between the bracket and the first and second portions to align vertically.

The fixing bracket further comprises a third portion, separated from the first and second portions of the bracket by a leg. The third portion is a base portion and is configured for attachment to a part of a roofing structure, such as a roof beam or a tile batten. The leg is perpendicular to the third portion. The third portion of the bracket is shown as being substantially parallel to the first and second portions of the bracket. In use, the bracket can be fixed (using, for example, fixing means such as screws) to the roof structure below.

In one embodiment, the first portion of the bracket 7 comprises a protruding element, shaped to have a leading edge that angles upwards (perpendicularly to the third portion) to ensure a smooth interface as the first solar panel connector is slid into location.

In another (non-exclusive) embodiment, the second portion of the bracket 7 comprises a protruding element 9, shaped to have a leading edge that angles upwards (perpendicularly to the third portion) to ensure a smooth interface as the second solar panel is slid into location.

The solar panel connector 2 further comprises a second slot/recess 5 on the same side as of the solar panel connector as the further slot/recess 6. When the structure is orientated with the base 7 of the fixing bracket 7 nearest to the ground, the second slot/recess 5 is located above the further slot/recess 6. The second slot/recess 5 is shaped to receive retaining means, such as a flexible gasket, for retaining a sheet of flashing 10.

The retaining means in the second slot/recess 5 may be a generally U-shaped section formed with a series of lips extending into the centre, such that when a thin sheet of material is pushed into it, they are deflected to form a series of seals against the upper and lower faces of the sheet of flashing 10.

Figure 4:
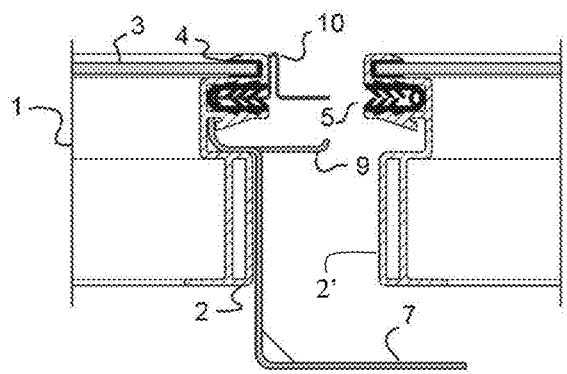
FIG. 4 is as for FIG. 3 with a flashing inserted into a first portion of the first solar panel connector.
Figure 5:
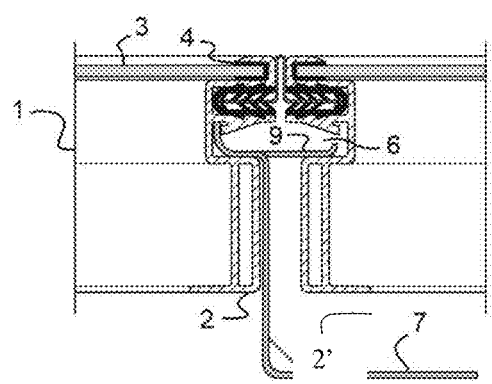
FIG. 5 is as for FIG. 3 with a second solar module slid into location to form a weather tight seal between the two panels and engage with the bracket.

As mentioned above, the roofing system also comprises flashing 10 for creating a weather-tight seal between the two close-coupled solar panels. In its simplest form this is a thin rectangular strip of a length that exceeds the length of the side of the panel that is to be close coupled and a width sufficient to push into the retaining means in the second slot/recess 5 on both solar panel connectors. The flashing 10 can be pushed into the retaining means of the second slot/recess 5 of the solar panel connector 2 along one side of the first solar panel connector (as shown in FIG. 4). When inserted, an unrestrained end of the flashing protrudes in the direction of the second solar panel connector in line with a corresponding retaining means in the second slot/recess of the second panel connector (as shown in FIGS. 4 and 5).

Figure 13:
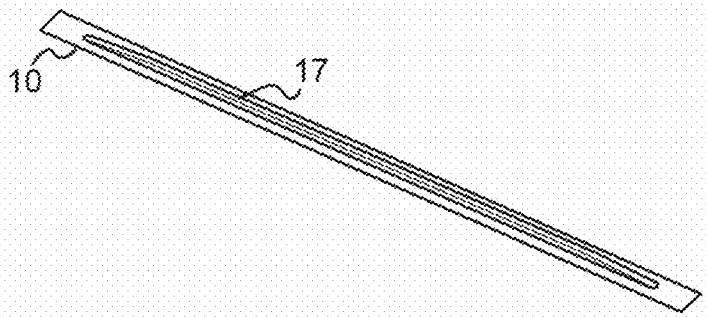
FIG. 13 shows an isometric sketch of a flashing according to an embodiment.

One advantageous embodiment of the flashing can include a formed ridge 17 that extends along at least part of the length of the flashing to provide stiffness in handling and to reduce the depth between the top surface of the panel and the flashing, thus encouraging water (e.g. rain water) to be shed onto the panels and away from the gasket/solar panel connector-flashing interface. This is shown in FIG. 13.

It can be seen that by fixing the first panel with a roof fixing bracket 7 as described and then pushing the flashing 10 into the retaining means of the second slot/recess 5 on the first solar panel connector, the second solar panel connector can be joined to the first solar panel connector to create a weather-tight seal between the two edges and to fix both solar panels modules to the roof structure below by the simple method of pushing the two together.

A method of fixing together the components of the first embodiment may therefore be considered to be as follows.

In a first step, a first portion 8 of bracket 7 is fixed to a second portion of a solar panel connector 2 (that is part of a solar module). One way of fixing the first portion of the bracket 7 to the second portion of the solar panel connector 2 is by simply fixing the two components together using screws, or some other fixing means. In a preferred embodiment, the first portion of the bracket 7 is configured to be fixed to the further slot 6 by being rotatably inserted into the further slot 6. In this case, at least one of the first portion 8 of the bracket 7 and the solar panel connector 2 are configured such that, after a minimum amount of rotation, the first portion 8 of the bracket 7 and the second portion of the solar panel connector 2 are rotatably locked onto each other. Instead, the only relative motion between the bracket 7 and the solar panel connector 2 is laterally and along a single axis.

In a second step, a third portion of the bracket 7 is used to attach the bracket 7 and the solar panel connector 2 to at least part of a roofing structure.

In a third step, flashing is inserted into the first portion on the first solar panel connector 2, for creating a weatherproof seal therebetween.

In a fourth step, a second portion 9 of the bracket 7 is used as a guide to slide the second solar panel connector 2' of another solar module into position, adjacent to the first solar panel connector. The second portion 9 of the bracket 7 is such that the second solar panel connector is constrained (once slid onto the bracket) to move laterally along the first axis and to move laterally out of the second portion of the bracket. The second solar panel connector cannot, however, move up or down (relative) to the roof to which the system is being attached. In other words, the second solar panel module is constrained to be unable to move in a direction perpendicular to the face of its photovoltaic glass once slid onto the second portion of the bracket.

In a fifth step, flashing is inserted into the first portion on the second solar panel connector 2', for creating a weatherproof seal therebetween. The fourth and the fifth step may be combined in a single operation.

Second Embodiment

The presently described second embodiment provides for the attaching bracket to provide support for, and allow definition of, a gutter extending between adjacent solar panel connectors. The gutter is used to direct water to shed downwards at the corners where four panels meet.

As in the first embodiment, there is provided a photovoltaic glass sheet 3 of a solar panel that may provide an attachment point to the solar panel connector 2 in a recess/slot on a first side of the solar panel connector 2. The attachment point may comprise a sealant compound 4 with the aim of contributing to providing a weather tight seal for the solar panel module 1.

Figure 12:
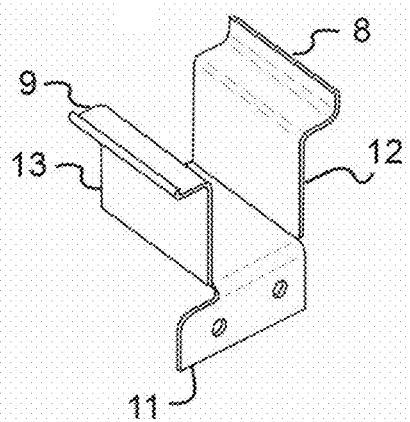
FIG. 12 shows an isometric sketch of a bracket according to the second embodiment.

The bracket 11 that is the focus of second embodiment is illustrated with respect to FIG. 12. As in the case of the first embodiment described above, the bracket 11 comprises three portions: a first portion 8 configured to engage with a second portion of a first solar panel connector 2, so that the first solar panel connector 2 and bracket 11 are slidably attached along a first axis; a second portion 9 configured to slidably engage with a second portion of a second solar panel connector; and a third (base) portion on which attachment means are provided for attaching to at least part of a roofing structure. The third portion is a base portion and is configured for attachment to a part of a roofing structure, such as a roof beam or a tile batten. The leg is perpendicular to the third portion. The third portion of the bracket is substantially parallel to the first and second portions of the bracket. In use, the bracket can be fixed (using, for example, fixing means such as screws) to the roof structure below.

The bracket 11 of the second embodiment differs from the first embodiment in that the bracket is substantially U-shaped, with the base of the U-shape providing the third portion, and respective legs 12, 13 of the U-shape corresponding to the first and second portions. The distance between the legs 12, 13 of the U-shape defines a maximum size of a gutter area spanning between the legs of the U-shape of the bracket 11. This is better illustrated with respect to FIGS. 6 to 10.

Figure 6:
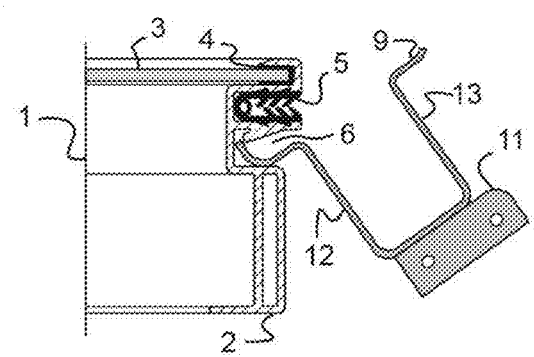
FIG. 6 shows a cross-sectional view of the side of a first solar module with a bracket according to a second embodiment in the process of insertion into the side of the first panel.
Figure 7:
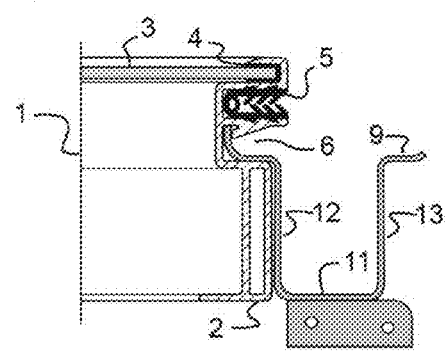
FIG. 7 shows the bracket of the second embodiment rotated into a finished position and ready to fix to a roof structure.
Figure 8:
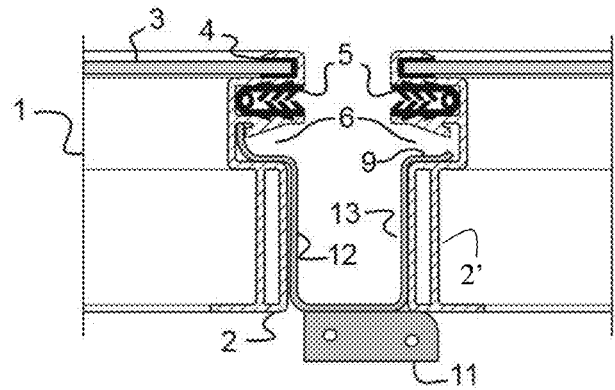
FIG. 8 shows a second solar module brought into sliding engagement with the bracket of the second embodiment.

In FIG. 6, the first portion of the bracket 11 of the second embodiment is being rotated into the second portion of the first solar panel connector 2 (this operation may also be viewed as the second portion of the first solar panel connector 2 being rotated onto a stationary/fixed bracket (depending on whether or not the bracket is already fixed to a roofing structure)). The rotation causes the bracket 11 and the first solar panel connector 2 to become slidably attached to each other such that the bracket 11 and the first solar panel connector 2 can only move laterally with respect to each other along a first axis. The first axis extends along the point of connection between the first portion of the bracket 11 and the second portion of the first solar panel connector. This operation results in the first solar panel connector being slidably attached to the bracket such that the first solar panels lateral movement (with respect to the bracket 11) is constrained along the first axis.

Subsequent to this step, a third portion (the base portion) of the bracket 11 may be used to attach the bracket 11 and the first solar panel connector/module to a roofing structure.

The second solar panel connector may then be slid onto and along the second portion of the bracket 11 by means of using the second portion 9 of the bracket 11 as a guide (in particular, using a lower surface of the second portion 9 of the bracket 11 ("lower" is defined in use relative to a roof structure, as described in the general section below)). This operation results in the second solar panel connector being slidably attached to the bracket such that the second solar panels lateral movement (with respect to the bracket 11) is constrained along and to move out of the bracket. The second solar panel connector cannot, however, move up or down relative to the roof to which the system is being attached. In other words, by locating the second solar panel connector in the second portion 9 of the bracket 11, the second solar panel module is constrained to be unable to move in a direction perpendicular to the face of its photovoltaic glass. In other words, the second solar panel connector 2' is configured to use a face of the bracket 11 as a guide along the length of the bracket to locate and/or orientate the second solar panel connector 2' with respect to the first solar panel connector 2. In particular, to set any displacement/offset of the outermost face of the photovoltaic glass 3 of the second solar panel connector 2' with respect to the outermost face of the photovoltaic glass 3 of the first solar panel connector 2. Preferably, the offset is zero.

As in the case of the first embodiment, the first portion of the bracket 11 may comprise a protruding element, shaped to have a leading edge that angles upwards (perpendicularly to the third portion) to ensure a smooth interface as the first solar panel connector is slid into location.

Further, the second portion of the bracket 11 may comprise a protruding element 9, shaped to have a leading edge that angles upwards (perpendicularly to the third portion 7) to ensure a smooth interface as the second solar panel is slid into location.

The solar panel connector 2 further comprises a second slot/recess 5 on the same side as of the solar panel connector as the further slot/recess 6. When the structure is orientated with the base 7 of the fixing bracket 7 nearest to the ground, the second slot/recess 5 is located above the further slot/recess 6. The second slot/recess 5 is shaped to receive retaining means, such as a flexible gasket, for retaining a sheet of flashing 15.

The retaining means in the second slot/recess 5 may be a generally U-shaped section formed with a series of lips extending into the centre, such that when a thin sheet of material is pushed into it, they are deflected to form a series of seals against the upper and lower faces of the sheet of flashing 15.

Once both the first and second solar panel connectors are set a fixed distance apart through use of the bracket 11, a gutter for the washing away of rainwater is thereby provided therebetween.

Figure 9:
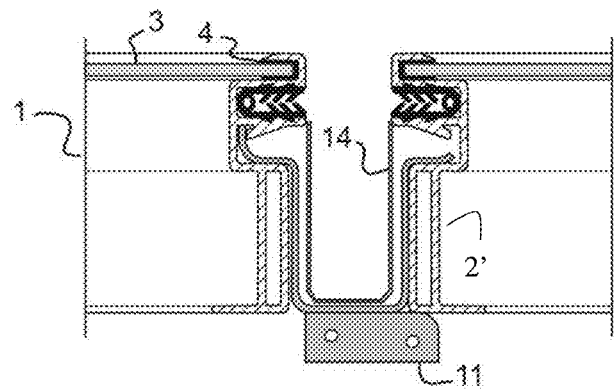
FIG. 9 shows a gutter element added between the solar panel connectors and fitted into the bracket of the second embodiment.
Figure 10:
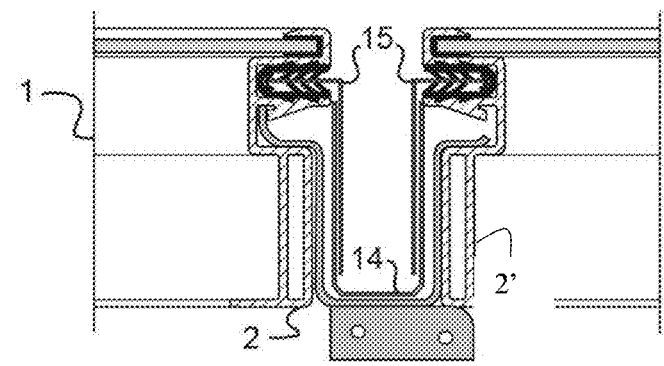
FIG. 10 shows the insertion of L shaped flashing into first portions of the first and second solar panel connectors to cover the open edge of the gutter component.
Figure 11:
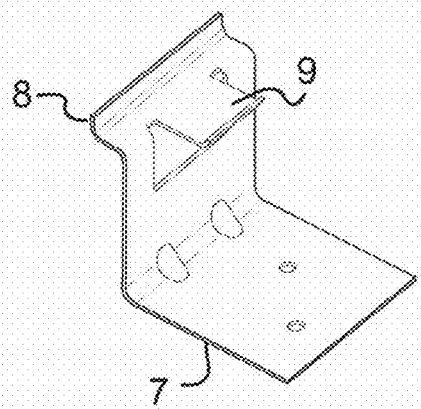
FIG. 11 shows an isometric sketch of a bracket according to the first embodiment.

To improve the provided gutters, a waterproof seal may be provided. This may be provided by use of two distinct components. One component is a U-shaped gutter element 14, configured so as to fit into the gap between the two sides of the bracket 11 as shown in FIG. 9. The U-shaped gutter elements may be configured so as to provide a light interference fit with the U-shaped bracket 11, thus grip the bracket 11 to prevent sliding.

The other component is flashing 15. In the present example, the flashing component 15 is provided by two separate L shaped covers 15. The flashing is configured to have at least one portion that protrudes into retaining located in a respective second slot/recess 5 in a respective solar panel connector. The connection between the flashing 15 and the second slot/recess of the solar panel connector is as described above with respect to the flashing 10 of the first embodiment. The remaining end 16 of the L-shaped flashing 15 is configured to bend into the U-shaped recess defined by the U-shaped guttering element 14. This arrangement is illustrated with respect to FIG. 10.

A method of fixing together the components of the second embodiment may therefore be considered to be as follows.

In a first step, a first portion of bracket 11 is rotated onto a second portion of a solar panel connector (that is part of a solar module). At least one of the first portion of the bracket 11 and the solar panel connector 2 are configured such that, after a minimum amount of rotation, the first portion of the bracket 11 and the second portion of the solar panel connector 2 are rotatably locked onto each other. Instead, the only relative motion between the bracket 11 and the solar panel connector 2 is laterally and along a single axis.

In a second step, a third portion of the bracket 11 is used to attach to at least part of a roofing structure.

In a third step, a second portion 9 of the bracket 11 is used as a guide to slide the second solar panel connector 2' of another solar module into position, adjacent to the first solar panel connector. The second portion 9 of the bracket 11 is such that the second solar panel connector is constrained (once slid onto the bracket) to move laterally along the first axis and to move laterally out of the second portion of the bracket. The second solar panel connector cannot, however, move up or down (relative) to the roof to which the system is being attached. In other words, the second solar panel module is constrained to be unable to move in a direction perpendicular to the face of its photovoltaic glass once slid onto the second portion of the bracket.

In a fourth step, a U-shaped gutter component is inserted in the bracket 11, between the first and second solar panel connectors. The U-shaped gutter component defines a channel for receiving water and for draining the water towards the edges of the roof to which the components are attached.

In a fifth step, respective L-shaped flashing components 15 are inserted into respective first portions on the first and second solar panel connectors, for establishing a weather-proof seal therebetween.

General Comments Applicable to all Embodiment

It is understood that the above two described embodiments may be implemented into the same roofing architecture. An example of this is shown in FIG. 1.

FIG. 1 shows an array of solar modules connected together. The isometric view appears from the top (defined with respect to a position of the solar modules when fixed to a roof. Consequently, aside from the solar modules, the flashings 10 and 15 are also viewable, as are gutter components 14 of the second embodiment, where flashing 10 corresponds to the flashing in the first embodiment and flashing 15 corresponds to the flashing in the second embodiment. The flashings 10 are arranged to extend along the length of a roof, whilst the flashings 15 and gutter components 15 are arranged to extend along the slope of the roof. This arrangement allows the channels defined by the gutter components 15 and the flashings 14 to run any incident rainwater off the roof efficiently, under the effect of gravity.

The solar panel connector 2 may be of extruded aluminium that is cut and joined at four corners to hold a photovoltaic glass cover sheet 3.

The sealant compound may be silicone 4.

Examples of suitable materials for the gasket are rubber and EPDM. It can be formed by extrusion, and joined with moulded mitred corners to form a continuous loop.

Throughout the above embodiments, reference is made to relative directions, such as "above" and "below". These are terms are used relative to the orientation in which the system/components assume when being used to attach to a roofing structure, with the fixing brackets 7, 11 being configured to connect to a roofing structure towards the bottom of the solar panel connector/bracket/flashing system.

Throughout the above, reference is made to the term "length" of a component. In this sense, the length of a component is the magnitude of its largest dimension.

The above detailed description of embodiments of the present invention is provided by way of example only, and various modifications can be made to these embodiments without departing from the scope of the invention.

The applicant draws attention to the fact that the present invention may include any feature or combination of features disclosed herein either implicitly or explicitly or any generalisation thereof, without limitation to the scope of any definitions set out above.

The invention claimed is:

1. A system comprising:
a sheet of flashing;
a first solar panel connector comprising:
a first portion extending along one or more sides of the first solar panel connector for receiving an edge section of the flashing to provide a weather-proof connection between the flashing and the first solar panel connector; and
a second portion extending along one or more sides of the first solar panel connector for receiving an edge section of a bracket and configured to receive said bracket either slidably in the second portion along a length of the second portion and/or to receive said bracket rotatably so that the solar panel connector and the bracket may move laterally relative to each other only along the length of the second portion;
a first solar panel joined to the first solar panel connector;
a second solar panel connector comprising:
a third portion extending along one or more sides of the second solar panel connector for receiving an edge section of the flashing to provide a weather-proof connection between the flashing and the second solar panel connector; and
a fourth portion extending along one or more sides of the second solar panel connector for receiving an edge section of said bracket and configured to receive said bracket either slidably in the fourth portion along the length of the fourth portion and/or to receive said bracket rotatably so that the solar panel connector and the bracket may move laterally relative to each other only along the length of the fourth portion;
a second solar panel joined to the second solar panel connector; and
said bracket comprising:
a fifth portion configured to hold the first solar panel connector, wherein the fifth portion is configured to retain the first solar panel connector with respect to the bracket after the fifth portion has been rotated onto the first solar panel connector so that the first solar panel connector and the bracket may move laterally relative to each other only along the length of the portion;
a sixth portion configured to provide a slideable guide along a length of the sixth portion for the second solar panel connector, the fifth and sixth portions being configured so that, when the first and second solar panel connectors are connected to the bracket, the first and second solar panels protrude away from the bracket in different directions; and
a seventh portion connected to said fifth and sixth portions and configured for attachment to a roof structure,
wherein the flashing is separate from the bracket and is configured such that, on being inserted into the first portion of the first solar panel connector, the flashing extends into the third portion of the second solar panel connector as the second solar panel is slid along the bracket, producing a weather tight seal between the first and second solar panel connectors; and
wherein the first portion of the first solar panel connector comprises one or more resilient members such that, in use, the insertion of the flashing into the first portion automatically forces at least one of said resilient members into a configuration in which they are biased against the flashing.

2. The system as claimed in claim 1, wherein the fifth portion of the bracket is configured to hold the first solar panel connector slidably, so that the first solar panel connector may be guided along the length of the fifth portion of the bracket.

3. The system as claimed in claim 1, wherein the bracket is substantially U-shaped, the first portion being located along one of the legs of the U-shape, the second portion being located along the other of the legs of the U-shape and the third portion being located along the base of the U-shape, further comprising:

U-shaped guttering located within the bracket, the height of the U-shaped guttering being below the height of the first portion of the first solar panel connector and the first portion of the second solar panel connector to prevent sliding movement between the gutter and the bracket when the gutter is inserted into the bracket.

4. The system as claimed in claim 3, wherein the U-shaped guttering is located within the bracket so as to have an interference fit therebetween.

5. The system as claimed in claim 1, wherein the first portion of the first solar panel connector and the third portion of the second solar panel connector are configured to align in the same plane when in use.

6. The system as claimed in claim 1, wherein the bracket is shaped such that the fifth and sixth portions are located at one end of the bracket and the seventh portion is located at an opposite end of the bracket.

7. The system as claimed in claim 1, wherein the fifth and sixth portions of the bracket are separated from the seventh portion of the bracket via a single connection.

8. The system as claimed in claim 1, the first solar panel connector having a first side configured to receive a solar panel and a second side, opposite to the first side, via which the first and second portions are accessible by the flashing and the bracket.

9. The system as claimed in claim 1, wherein the first portion is arranged to be above the second portion when the first solar panel connector is being used to fix a solar panel to a roof.

10. The system as claimed in claim 1, wherein the first portion is formed as a continuous gasket around the periphery of the first solar panel connector.

11. The system as claimed in claim 1, wherein the third portion of the second solar panel connector comprises one or more resilient members such that, in use, the insertion of flashing into the third portion automatically forces at least one of said resilient members into a configuration in which they are biased against said flashing.

* * * * *